United States Patent
Dong

(10) Patent No.: US 8,786,305 B2
(45) Date of Patent: Jul. 22, 2014

(54) TEST CIRCUIT AND TEST METHOD FOR DETECTING ELECTRICAL DEFECT IN TFT-LCD

(75) Inventor: Yun Dong, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 429 days.

(21) Appl. No.: 13/297,711

(22) Filed: Nov. 16, 2011

(65) Prior Publication Data

US 2012/0119776 A1 May 17, 2012

(30) Foreign Application Priority Data

Nov. 17, 2010 (CN) .......................... 2010 1 0549182

(51) Int. Cl.
*G01R 31/26* (2014.01)
*G09G 3/00* (2006.01)
*G02F 1/13* (2006.01)

(52) U.S. Cl.
CPC .............. *G09G 3/006* (2013.01); *G02F 1/1309* (2013.01)
USPC ................................. 324/762.02; 324/762.01

(58) Field of Classification Search
CPC ............................... G06F 3/006; G02F 1/1309
USPC ............... 324/760.02, 760.01, 537, 500, 555, 324/718, 456, 237, 238, 240, 713, 770; 702/35; 73/615; 348/125, 246, 247, 348/615
See application file for complete search history.

(56) References Cited

U.S. PATENT DOCUMENTS

| | | | | |
|---|---|---|---|---|
| 7,151,384 B2 * | 12/2006 | Ueno et al. | ..................... | 324/713 |
| 7,486,100 B2 * | 2/2009 | Sakaguchi et al. | ........ | 324/760.01 |
| 7,978,903 B2 * | 7/2011 | Kojima et al. | ................ | 382/149 |
| 8,368,417 B2 * | 2/2013 | Li et al. | ..................... | 324/760.01 |
| 8,525,540 B2 * | 9/2013 | Peng et al. | ................ | 324/760.01 |
| 2006/0097744 A1 * | 5/2006 | Tejima et al. | ................. | 324/770 |
| 2006/0176072 A1 * | 8/2006 | Kim et al. | ..................... | 324/770 |
| 2006/0284646 A1 | 12/2006 | Shimizume et al. | | |
| 2008/0136440 A1 * | 6/2008 | Kim et al. | ..................... | 324/770 |
| 2010/0090719 A1 | 4/2010 | Peng et al. | | |
| 2012/0064643 A1 * | 3/2012 | Bawolek et al. | ................ | 438/16 |

FOREIGN PATENT DOCUMENTS

| | | |
|---|---|---|
| CN | 101493589 A | 7/2009 |
| CN | 101655615 A | 2/2010 |
| CN | 101719352 A | 6/2010 |

* cited by examiner

*Primary Examiner* — Hoai-An D Nguyen
(74) *Attorney, Agent, or Firm* — Ladas & Parry LLP

(57) ABSTRACT

The present disclosure discloses a test circuit and a test method for detecting a TFT-LCD electrical defect, which relates to the field of liquid crystal display and is able to distinguish effectively between a capacitive defect and a TFT defect. The test circuit for detecting a TFT-LCD electrical defect includes: a test apparatus connected with the input terminals of a first reference voltage and a second reference voltage corresponding to the same gray scale, the test apparatus controls the output terminals of the first reference voltage and the second reference voltage to output a constant voltage to a data line. The present disclosure can be applied to a liquid crystal display.

11 Claims, 4 Drawing Sheets

| in each frame of picture, controlling both output terminals of a first reference voltage and a second reference voltage corresponding to the same gray scale to output a constant voltage to the data line | 101 |

TEST CIRCUIT AND TEST METHOD FOR DETECTING ELECTRICAL DEFECT IN TFT-LCD

BACKGROUND

The present disclosure relates to a TFT-LCD (Thin Film Transistor Liquid Crystal Display), especially to a test circuit and test method for detecting an electrical defect in TFT-LCD.

In the flat display technology, the TFT-LCD has characteristics such as small size, low power consumption, no radiation, relatively low manufacturing cost and so on, and dominates the current flat display market.

With LCD (Liquid Crystal Display) production being enlarged increasingly, the product performance is improved increasingly, and the defect detection for products plays an important role in the whole production process.

In the detection process of TFT-LCD, an electrical defect and an optical defect can be distinguished from each other effectively by using a DC/DC (direct current-to-direct current power supply) test method, and thereby the location range of a defect in the forepart project can be reduced greatly, thus providing a great help for looking rapidly for the defect mechanism and countermeasure.

However, after knowing that one display screen contains an electrical defect, there is still no perfect method in the current mass production test about how to distinguish whether it is related to capacitance or TFT. The current test method after the liquid crystal cell process, like the test method and test mechanism of a terminal, can detect various optical and electrical defects of a LCD perfectly, but on the premise of knowing that the defect is resulted from an electrical defect, it is still unable to perfectly distinguish whether it is related to capacitance or TFT. Especially some uneven-light-and-dark-mark (Mura) type defects, when arising in a large scale, can not be distinguished out in time, which leads to slowness of the defect location, thereby resulting in a great loss.

SUMMARY

One of the technical problems to be solved by the present disclosure is to provide a test circuit and a test method for a TFT-LCD electrical defect, which is capable of distinguishing between a capacitive defect and a TFT defect effectively.

An embodiment of the disclosure provides a test circuit for detecting a TFT-LCD electrical defect including a test apparatus connected with the input terminals of a first reference voltage and a second reference voltage corresponding to the same gray scale, the test apparatus controlling the output terminals of the first reference voltage and the second reference voltage to output a constant voltage to a data line.

In an example, the test apparatus includes a first switch controlled by a first control signal, the first switch being connected with the input terminal of the first reference voltage or the second reference voltage; and a second switch controlled by a second control signal, the two terminals of the second switch being connected with the input terminals of the first reference voltage and the second reference voltage respectively.

In an example, when testing, the first control signal controls the first switch to be open so as to disconnect the circuit of the input terminal of the first reference voltage or the second reference voltage; the second control signal controls the second switch to be closed so as to connect the circuit between the input terminals of the first reference voltage and the second reference voltage.

In an example, the test apparatus includes a selection switch controlled by a selection control signal, a fixed connection terminal of the selection switch being connected with the input terminal of the first reference voltage or the second reference voltage, and a selection connection terminal of the selection switch selecting to connect the circuit between the input terminal of the first reference voltage or the second reference voltage and the fixed connection terminal of the selection switch or selecting to connect the circuit between the input terminals of the first reference voltage and the second reference voltage.

In an example, when testing, the selection connection terminal of the selection switch connects the circuit between the input terminals of the first reference voltage and the second reference voltage.

Another embodiment of the disclosure provides a test method of detecting a TFT-LCD electrical defect which includes: in each frame of a picture, controlling both output terminals of a first reference voltage and a second reference voltage corresponding to the same gray scale to output a constant voltage to a data line.

In an example, after controlling both output terminals of the first reference voltage and the second reference voltage corresponding to the same gray scale to output the constant voltage to the data line, the method may include: obtaining pictures in different gray scales by adjusting a common electrode voltage Vcom to adjust gray scales.

In an example, the range of the gray scales may be L40~L80 or L100~L150.

In an example, in each frame of the picture, controlling both output terminals of the first reference voltage and the second reference voltage corresponding to the same gray scale to output the constant voltage to the data line includes: at the current frame, the numerical value of the voltage output to the data line is equal to that of the voltage of the first reference voltage or the second reference voltage corresponding to the same gray scale; and at the next frame, the voltage output to the date line is the same as the voltage output to the data line at the previous frame.

In the technical solution of the present embodiment, two reference voltages corresponding to the same gray scale are controlled to output the same constant voltage to the data line, thereby the polarity of a liquid crystal is not inverted, and the direct current detection is realized. The direct current test may charge a TFT at all times and there is no discharging process, so the influence of the TFT defect may be eliminated. Furthermore, due to the presence of a scan signal, the capacitive defect can not be eliminated, so that it is possible to distinguish effectively between the capacitive defect and the TFT defect.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

In order to more clearly illustrate technical solutions in embodiments of the present disclosure, a brief introduction will be made to the attached drawings needed to be used in the description of the embodiments in the following. Obviously, the attached drawings of the embodiments in the following description are only some embodiments of the present disclosure, and for those of ordinary skill in the art, other attached drawings may be obtained according to these attached drawings without inventive efforts.

DETAILED DESCRIPTION

In the following, the technical solutions of the embodiments of the present disclosure will be described clearly and completely in combination with the attached drawings. Obviously, the described embodiments are only some embodiments of the present disclosure and are not all of the embodiments. Based on the embodiments of the present disclosure, all of other embodiments obtained by those of ordinary skill in the art without inventive efforts belong to the protection scope of the present disclosure.

The present embodiments provide a test circuit and a test method for detecting a TFT-LCD electrical defect, which is capable of distinguishing between a capacitive defect and a TFT defect.

A capacitive defect refers to a defect caused due to the disqualification of a capacitance (multiple parasitic capacitances are formed in an array substrate structure), and a TFT defect refers to a defect caused due to the disqualification of the electrical property of the TFT. The both are likely to result in the uneven-light-and-dark-mark (Mura) type defect.

The basic principle of a TFT-LCD displaying an image is to use liquid crystal molecules mixed between two electrode plates, of which the rotation angles are different thus the light transmission amounts are different either under different voltages, so that it is realized that each of independent pixels controls different gray scales, and different data signals provided by the data line are used to control accurately the voltages of the upper and lower electrode plates of each pixel so as to realize a picture image as required.

Figure 1:
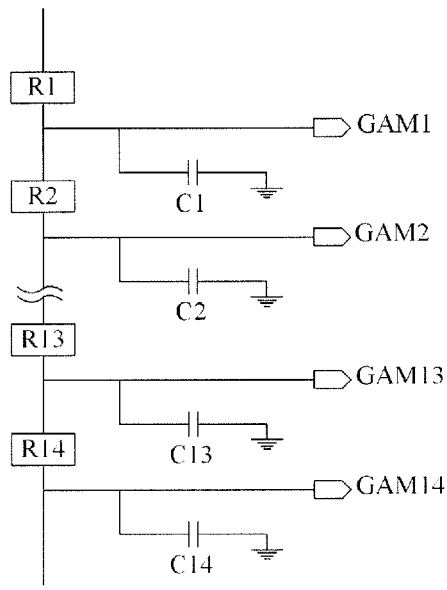
FIG. 1 is a circuit schematic diagram of a PCB reference voltage in the prior art.

In order to prevent the liquid crystal from aging under an electric field of a single direction, and avoid a direct current block effect and a direct current residue and so on, the polarity of a signal is generally inverted. For example, the polarity inversion may be implemented by a chip and fourteen reference voltages (GAM1~GAM14) with the fourteen reference voltages controlling 256 gray scales of a display. Taking that the reference voltages at GAM1 and GAM14 correspond to the gray scale L0, data lines respectively output voltages of 10V and 0V, and the common electrode voltage (i.e., Vcom) is 5V as an example, as shown in FIG. 1, the voltages at two terminals of the liquid crystal are 5V and −5V in this case, that is, the polarity inversion of the gray scale L0 is realized by GAM1 and GAM 14. The principle for the polarity inversion of other gray scales is the same. For example, the gray scales L64 and L127 correspond to respective reference voltages as well, and their polarity inversions can be similarly realized by the difference of values of the reference voltages.

Figure 2:
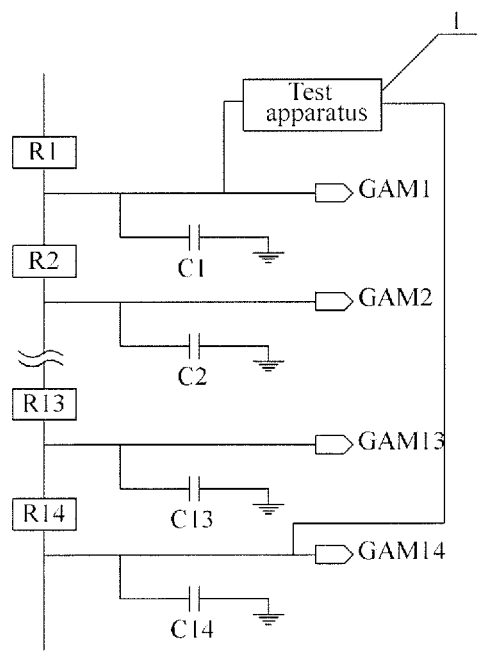
FIG. 2 is a first schematic diagram for a structure of a test circuit of an embodiment of the present disclosure.

An embodiment of the present disclosure provides a test circuit for detecting a TFT-LCD electrical defect, as shown in FIG. 2, the test circuit includes: a test apparatus 1 connected with the input terminals of a first reference voltage and a second reference voltage corresponding to the same gray scale, the test apparatus 1 controls the output terminals of the first reference voltage and the second reference voltage to output constant voltages to data lines.

The test apparatus 1 may be configured between any two reference voltages corresponding to the same gray scale. For example, as shown in FIG. 2, the first reference voltage may be the reference voltage GAM1, and the second reference voltage may be the reference voltage GAM14, so the test apparatus 1 is configured between GAM1 and GAM14. The test apparatus may be configured between other two reference voltages corresponding to the same gray scale.

When testing, the test apparatus 1 controls GAM1 and GAM14 to commonly use one voltage. Specifically, at the time when GAM1 is selected as the voltage output to the data line, the test apparatus 1 controls the input of GAM1 to be turned off, and makes GAM14 as the output of GAM1 to the data line; at the time when GAM14 is selected as the voltage output to the data line, GAM14 still outputs to the data line. The test apparatus 1 controls a voltage equal to GAM14 in the numerical value to be kept outputting to the data line during the entire picture display process, therefore, the polarity is not inverted, and it is equivalent to a direct current output at this time, and the direct current detection of a constant voltage output is realized.

In the technical solution of the present embodiment, two reference voltages corresponding to the same gray scale are controlled by the test apparatus to output the same constant voltage to the data line, thereby the polarity of the liquid crystal is not inverted and the direct current detection is realized. Since the direct current test may charge a TFT at all times and there is no discharging process, the influence of the TFT defect may be eliminated. However, due to the presence of a scan signal, the capacitive defect can not be eliminated, so that it is possible to distinguish effectively between the capacitive defect and the TFT defect.

In an actual test process, since the picture of L0 is a black picture, and many Mura-type defects are difficult to be found out under this gray scale, the effect of adjusting gray scales may be achieved by adjusting the magnitude of the signal Vcom in the test process on a CT device. For example, the Mura-type defects can be better detected when the range of gray scales is in L40~L80 or L100~L150. Under any one set gray scale, in the test process on the CT device, it is possible to employ a method of adjusting Vcom to adjust arbitrarily the gray scales so as to achieve the picture of the gray scale as required, which is convenient to better detect defects.

When the polarity is not inverted and the direct current detection is realized, the specific defect can be determined by observing the variation of the defect of the detected screen under different gray scales. As described above, if the defect disappears at this time, it is indicated that the electrical defect is a TFT defect; otherwise, if the defect does not disappear, it is a capacitive defect.

Figure 3:
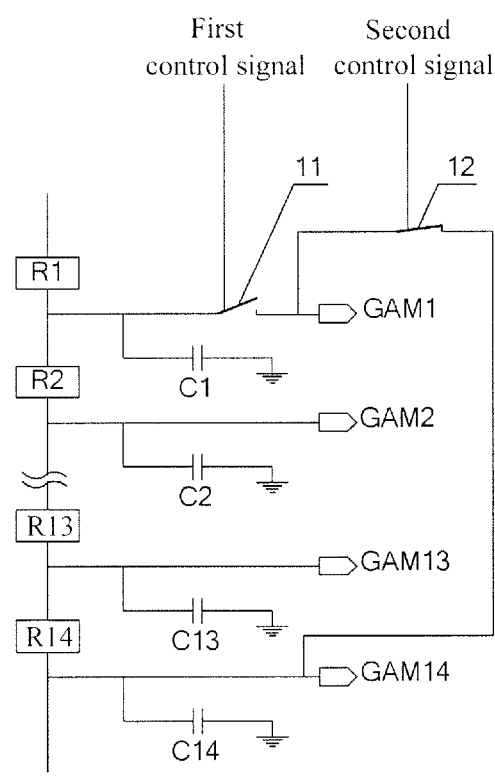
FIG. 3 is a second schematic diagram for a structure of a test circuit of an embodiment of the present disclosure.

Further, as shown in FIG. 3, the test apparatus may include: a first switch 11 controlled by a first control signal, the first switch 11 is connected with the input terminal of the first reference voltage or the second reference voltage; and a second switch 12 controlled by a second control signal, two terminals of the second switch 12 are connected between the input terminals of the first reference voltage and the second reference voltage.

When the first switch 11 is closed and the second switch 12 is open, it is realized that the polarity of the data signal is inverted at this time, that is, the displaying is normal.

When defects are present in the test screen and it is required to distinguish between TFT defects and capacitive defects, an operator or machine provides the first control signal and the second control signal by a device automatically in accordance with a preset program. The first control signal controls the first switch 11 to be open so as to disconnect the circuit of the input terminal of the first reference voltage or the second reference voltage, and the second control signal controls the second switch 12 to be closed so as to connect the circuit between the input terminals of the first reference voltage and the second reference voltage. Therefore, it is realized that a constant voltage equal to the first reference voltage or the second reference voltage is output to the data line at each frame of picture.

That is, at the time of testing, since the first switch 11 is open and the second switch 12 is closed, it is equivalent to the case that GAM1 and GAM14 commonly use one voltage, i.e., the voltage of GAM14. Specifically, at the time when GAM1 is selected as the voltage output to the data line, GAM14 acts as the output of GAM1 to the data line; at the time when GAM14 is selected as the voltage output to the data line, GAM14 still outputs to the data line. Thus, it is controlled that a voltage equal to GAM14 in numerical value is kept outputting to the data line during the entire picture display process, thereby, the polarity is not inverted, and it is equivalent to a direct current output at this time and the direct current detection of a constant voltage output is realized. Since the direct current test may charge a TFT at all times and there is no discharging process, the influence of the TFT defect may be eliminated. However, due to the presence of a scan signal, the capacitive defect can not be eliminated, so that it is possible to distinguish effectively between the capacitive defect and the TFT defect.

In the technical solution of the present embodiment, signal control switches are set between two reference voltages corresponding to the same gray scale so as to output a constant voltage to the data line, which allows the polarity of liquid crystal not to be inverted, and the direct current detection is realized. The direct current test may perform charging a TFT at all times and there is no discharging process, so the influence of the TFT defect may be eliminated. However, due to the presence of a scan signal, the capacitive defect can not be eliminated, so that it is possible to distinguish effectively between the capacitive defect and the TFT defect.

Figures 4, 5:
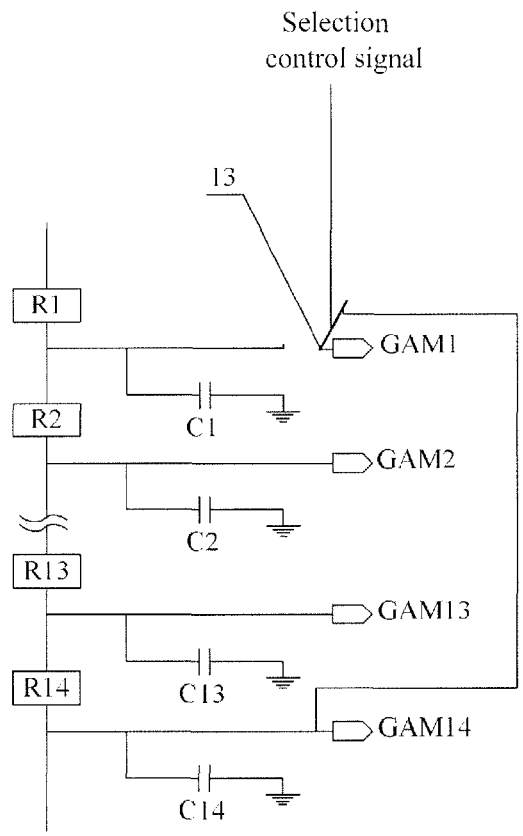
FIG. 4 is a third schematic diagram for a structure of a test circuit of an embodiment of the present disclosure.
FIG. 5 is a first flowchart for a test method of an embodiment of the present disclosure.

Further, as shown in FIG. 4, the test apparatus may also include: a selection switch 13 controlled by a selection control signal, a fixed connection terminal of the selection switch 13 is connected with the input terminal of the first reference voltage or the second reference voltage, and a selection connection terminal of the selection switch 13 selects to connect the circuit between the input terminal of the first reference voltage or the second reference voltage and the fixed connection terminal of the selection switch 13, or to connect the circuit between the input terminals of the first reference voltage and the second reference voltage.

As shown in FIG. 4, when the selection connection terminal of the selection switch 13 connects the circuit between the input terminal of the first reference voltage or the second reference voltage and the fixed connection terminal of the selection switch 13, it is realized that the polarity of the data signal is inverted at this time, that is, the displaying is normal.

When defects are present in the test screen and it is required to distinguish between TFT defects and capacitive defects, an operator or machine provides the selection control signal automatically by a device in accordance with a preset program so as to control the selection connection terminal of the selection switch 13 to connect the circuit between the input terminals of the first reference voltage and the second reference voltage. At this time, the circuit of the input terminal of the first reference voltage or the second reference voltage which is connected with the fixed connection terminal of the selection switch 13 is disconnected, therefore, it is realized that a constant voltage equal to the first reference voltage or the second reference voltage is output to the data line at each frame of picture.

Specifically, as shown in FIG. 4, since the selection switch 13 selects to connect the circuit between GAM1 and GAM14, which is equivalent to that GAM1 and GAM14 commonly use one voltage, i.e., the voltage of GAM14. At the time when GAM1 is selected as the voltage output to the data line, GAM14 acts as the output of GAM1 to the data line; at the time when GAM14 is selected as the voltage output to the data line, GAM14 still outputs to the data line. Thus, it is controlled that a voltage equal to GAM14 in numerical value is kept outputting to the data line during the entire picture display process, thereby, the polarity is not inverted, and it is equivalent to a direct current output at this time and the direct current detection of a constant voltage output is realized. Since the direct current test may perform charging a TFT at all times and there is no discharging process, the influence of the TFT defect may be eliminated. However, due to the presence of a scan signal, the capacitive defect can not be eliminated, so that it is possible to distinguish effectively between the capacitive defect and the TFT defect.

In the technical solution of the present embodiment, the selection switch is set between two reference voltages corresponding to the same gray scale so as to connect the two reference voltages with each other and disconnect one of input terminals of the two reference voltages, so that a constant voltage equal to the other reference voltage is output to the data line, which allows the polarity not to be inverted, and the direct current detection is realized. The direct current test may perform charging a TFT at all times and there is no discharging process, so the influence of the TFT defect may be eliminated. However, due to the presence of a scan signal, the capacitive defect can not be eliminated, so that it is possible to distinguish effectively between the capacitive defect and the TFT defect.

An embodiment of the present disclosure provides a test method by using the test circuit as described above, as shown in FIG. 5, the method includes:

a step 101 in which in each frame of picture, both output terminals of the first reference voltage and the second reference voltage corresponding to the same gray scale are controlled to output a constant voltage to the data line.

As shown in FIG. 2, taking the case that GAM1 and GAM14 correspond to the same gray scale L0 as an example, the test apparatus 1 controls, when testing, GAM1 and GAM14 to commonly use one voltage. Specifically, at the time when GAM1 is selected as the voltage output to the data line, the test apparatus 1 controls the input of GAM1 to be turned off, and makes GAM14 as the output of GAM1 to the data line; at the time when GAM14 is selected as the voltage output to the data line, GAM14 still outputs to the data line, and the test apparatus 1 controls a voltage equal to GAM14 in numerical value to be kept outputting to the data line during the entire picture display process, therefore, the polarity is not inverted, and it is equivalent to a direct current output at this time and the direct current detection of a constant voltage output is realized. Since the direct current test may perform charging a TFT at all times and there is no discharging process, the influence of the TFT defect may be eliminated. However, due to the presence of a scan signal, the capacitive defect can not be eliminated, so that it is possible to distinguish effectively between the capacitive defect and the TFT defect.

Figure 6:
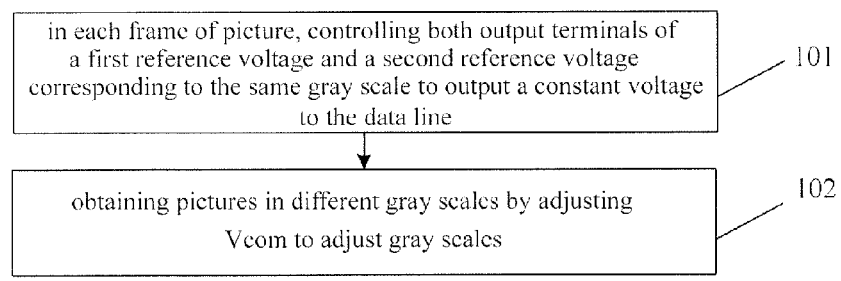
FIG. 6 is a second flowchart for a test method of an embodiment of the present disclosure.

Further, after the step 101, as shown in FIG. 6, the method further includes:

a step 102 in which pictures in different gray scales are obtained by adjusting Vcom to adjust gray scales.

In an actual test process, since the picture of L0 is a black picture and many Mura-type defects are difficult to be found out under this gray scale, the effect of adjusting gray scales may be achieved by adjusting the magnitude of the signal Vcom in the test process on a CT device. For example, the Mura-type defects can be better detected when the range of gray scales is in L40~L80 or L100~L150. Under any one set gray scale, in the test process on the CT device, it is possible to employ a method of adjusting Vcom to adjust the gray scales arbitrarily so as to achieve the picture of the gray scale as required, which is convenient to better detect defects.

The variation of the defect of the screen is detected so as to determine the specific type of defect by observing a picture under different gray scales. If the defect disappears, it is indicated that the electrical defect is a TFT defect; otherwise, if the defect does not disappear, it is a capacitive defect.

Figure 7:
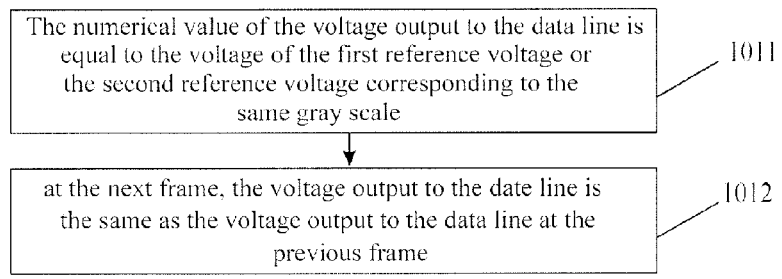
FIG. 7 is a flowchart of the step 101 in a test method of an embodiment of the present disclosure.

Further, as shown in FIG. 7, the step 101 includes:

a step 1011 in which at the current frame, the numerical value of voltage output to the data line is equal to that of the first reference voltage or the second reference voltage both of which correspond to the same gray scale.

As shown in FIG. 3, when defects are present in the test screen and it is required to distinguish between TFT defects and capacitive defects, an operator or machine provides the first control signal and the second control signal by a device, the first control signal controls the first switch 11 to be open and the second control signal controls the second switch 12 to be closed. GAM14 acts as the output of GAM1 to the data line at the time when GAM1 is selected as the voltage output to the data line.

The step 101 further includes:

a step 1012 in which at the next frame, the voltage output to the data line is the same as the voltage output to the data line at the previous frame.

At the time when GAM14 is selected as the voltage output to the data line, GAM14 still outputs to the data line, so that a voltage equal to GAM14 in numerical value is controlled to be kept outputting to the data line during the entire picture display process, therefore, the polarity is not inverted, and it is equivalent to a direct current output at this time.

In the technical solution of the present embodiment, two reference voltages corresponding to the same gray scale which implement the polarity inversion output a constant voltage in the same numerical value to the data line, thereby the polarity of the liquid crystal is not inverted and the direct current detection is realized. The direct current test may perform charging a TFT at all times and there is no discharging process, so the influence of the TFT defect may be eliminated. However, due to the presence of a scan signal, the capacitive defect can not be eliminated, so that it is possible to distinguish effectively between the capacitive defect and the TFT defect.

By the description of the above embodiments, those skilled in the art may understand clearly that the present disclosure can be implemented by means of software plus necessary general purpose hardware, and, of course, can also be implemented by hardware; however, the former is the better implementation in many cases. Based on such understanding, the technical solution of the present disclosure essentially or, in other words, a part contributing to the prior art can be embodied in a form of a software product which is stored in a readable storage medium such as a floppy, a hard disk or a compact disk etc and contains several instructions to make a computer (which may be a personal computer, a server or a network device etc) perform the methods as described in respective embodiments.

The described above is only specific embodiments of the present disclosure, however, the protection scope of the present disclosure is not limited thereto and any skilled familiar with the present technical field may easily think of variations and replacements, which are all covered within the protection scope of the present disclosure, within the technical scope disclosed by the present disclosure. Therefore, the protection scope of the present disclosure should refer to the claims.

What is claimed is:

1. A test circuit for detecting a thin film transistor liquid crystal display (TFT-LCD) electrical defect, comprising a test apparatus connected with the input terminals of a first reference voltage and a second reference voltage corresponding to the same gray scale, the test apparatus controlling the output terminals of the first reference voltage and the second reference voltage to output a constant voltage to a data line.

2. The test circuit according to claim 1, wherein the test apparatus comprises: a first switch controlled by a first control signal, the first switch being connected with the input terminal of the first reference voltage or the second reference voltage; and a second switch controlled by a second control signal, the two terminals of the second switch being connected between the input terminals of the first reference voltage and the second reference voltage respectively.

3. The test circuit according to claim 2, wherein when testing, the first control signal controls the first switch to be open so as to disconnect the circuit of the input terminal of the first reference voltage or the second reference voltage; the second control signal controls the second switch to be closed so as to connect the circuit between the input terminals of the first reference voltage and the second reference voltage.

4. The test circuit according to claim 1, wherein the test apparatus comprises a selection switch controlled by a selection control signal, a fixed connection terminal of the selection switch being connected with the input terminal of the first reference voltage or the second reference voltage, and a selection connection terminal of the selection switch selecting to connect the circuit between the input terminal of the first reference voltage or the second reference voltage and the fixed connection terminal of the selection switch, or selecting to connect the circuit between the input terminals of the first reference voltage and the second reference voltage.

5. The test circuit according to claim 4, wherein when testing, the selection connection terminal of the selection switch connects the circuit between the input terminals of the first reference voltage and the second reference voltage.

6. A test method of detecting a thin film transistor liquid crystal display (TFT-LCD) electrical defect, comprising:
in each frame of picture, controlling both output terminals of a first reference voltage and a second reference voltage corresponding to the same gray scale to output a constant voltage to a data line.

7. The test method according to claim 6, after said controlling both output terminals of the first reference voltage and the second reference voltage corresponding to the same gray scale to output the constant voltage to the data line, further comprising:

obtaining pictures in different gray scales by adjusting a common electrode voltage Vcom to adjust gray scales.

8. The test method according to claim 7, wherein the range of the gray scales is in L40~L80 or L100~L150.

9. The test method according to claim 6, wherein in each frame of picture, said controlling both output terminals of the first reference voltage and the second reference voltage corresponding to the same gray scale to output the constant voltage to the data line comprises:
- at the current frame, the numerical value of the voltage output to the data line is equal to that of the first reference voltage or the second reference voltage corresponding to the same gray scale; and
- at the next frame, the voltage output to the date line is the same as the voltage output to the data line at the previous frame.

10. The test method according to claim 7, wherein in each frame of picture, said controlling both output terminals of the first reference voltage and the second reference voltage corresponding to the same gray scale to output the constant voltage to the data line comprises:
- at the current frame, the numerical value of the voltage output to the data line is equal to that of the first reference voltage or the second reference voltage corresponding to the same gray scale; and
- at the next frame, the voltage output to the date line is the same as the voltage output to the data line at the previous frame.

11. The test method according to claim 8, wherein in each frame of picture, said controlling both output terminals of the first reference voltage and the second reference voltage corresponding to the same gray scale to output the constant voltage to the data line comprises:
- at the current frame, the numerical value of the voltage output to the data line is equal to that of the first reference voltage or the second reference voltage corresponding to the same gray scale; and
- at the next frame, the voltage output to the date line is the same as the voltage output to the data line at the previous frame.

* * * * *